(12) United States Patent
Lee et al.

(10) Patent No.: US 12,013,923 B2
(45) Date of Patent: Jun. 18, 2024

(54) ELECTRONIC DEVICE AND METHOD FOR RECOGNIZING OBJECT

(71) Applicant: Samsung Electronics Co., Ltd., Suwon-si (KR)

(72) Inventors: Heejun Lee, Suwon-si (KR); Tushar Balasaheb Sandhan, Suwon-si (KR); Hyeongwook Yang, Suwon-si (KR); Juwoan Yoo, Suwon-si (KR); Wonsuk Jang, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 17/167,376

(22) Filed: Feb. 4, 2021

(65) Prior Publication Data
US 2021/0248218 A1 Aug. 12, 2021

(30) Foreign Application Priority Data

Feb. 7, 2020 (KR) .................. 10-2020-0015176

(51) Int. Cl.
*H04N 25/58* (2023.01)
*G06F 21/32* (2013.01)
(Continued)

(52) U.S. Cl.
CPC .............. *G06F 21/32* (2013.01); *G06V 10/44* (2022.01); *G06V 10/50* (2022.01); *G06V 40/161* (2022.01);
(Continued)

(58) Field of Classification Search
CPC ...... G06F 21/32; G06V 40/161; G06V 10/50; G06V 40/40; G06V 10/44; G06V 40/45; H04N 25/58; H04N 25/46; H04N 25/705
(Continued)

(56) References Cited

U.S. PATENT DOCUMENTS

| 8,437,513 B1 | 5/2013 | Derakhshani et al. |
| 8,675,925 B2 | 3/2014 | Derakhshani et al. |

(Continued)

FOREIGN PATENT DOCUMENTS

| JP | 2018173731 A | 11/2018 |
| KR | 10-2017-0051392 A | 5/2017 |

(Continued)

OTHER PUBLICATIONS

International Search Report dated May 28, 2021, issued in International Patent Application No. PCT/KR2021/001427.
(Continued)

*Primary Examiner* — Trang U Tran
(74) *Attorney, Agent, or Firm* — Jefferson IP Law, LLP

(57) ABSTRACT

An electronic device is provided. The electronic device includes a camera including an image sensor including a plurality of pixels, a memory, and a processor that controls the camera. Each pixel included in the plurality of pixels includes a plurality of photodiodes and a microlens covering the plurality of photodiodes. The processor obtains phase images and image data for an external object using the plurality of photodiodes of the image sensor and authenticates the external object using the phase images and the image data. In addition, various embodiments recognized through the specification are possible.

20 Claims, 10 Drawing Sheets

(51) Int. Cl.
*G06V 10/44* (2022.01)
*G06V 10/50* (2022.01)
*G06V 40/16* (2022.01)
*G06V 40/40* (2022.01)
*H04N 25/46* (2023.01)
*H04N 25/705* (2023.01)

(52) U.S. Cl.
CPC .............. *G06V 40/40* (2022.01); *G06V 40/45* (2022.01); *H04N 25/46* (2023.01); *H04N 25/58* (2023.01); *H04N 25/705* (2023.01)

(58) Field of Classification Search
USPC .......................................................... 348/180
See application file for complete search history.

(56) References Cited

U.S. PATENT DOCUMENTS

| | | |
|---|---|---|
| 8,787,628 B1 | 7/2014 | Derakhshani et al. |
| 9,003,196 B2 | 4/2015 | Hoyos et al. |
| 9,104,921 B2 | 8/2015 | Derakhshani et al. |
| 9,420,164 B1 | 8/2016 | Galor Gluskin et al. |
| 9,729,779 B2 | 8/2017 | Galor Gluskin et al. |
| 9,749,556 B2 | 8/2017 | Fettig et al. |
| 9,769,382 B2 | 9/2017 | Kim et al. |
| 9,804,357 B2 | 10/2017 | Galor Gluskin et al. |
| 9,971,920 B2 | 5/2018 | Derakhshani et al. |
| 9,978,154 B2 | 5/2018 | Hsu et al. |
| 9,996,684 B2 | 6/2018 | Hoyos et al. |
| 10,044,959 B2 * | 8/2018 | Galor Gluskin ..... H04N 23/672 |
| 10,148,864 B2 | 12/2018 | Wang et al. |
| 10,600,196 B2 | 3/2020 | Hsu et al. |
| 10,616,467 B2 | 4/2020 | Wang et al. |
| 10,678,898 B2 | 6/2020 | Hoyos et al. |
| 11,030,470 B2 * | 6/2021 | Han ........................ H04N 5/33 |
| 11,210,380 B2 | 12/2021 | Hoyos et al. |
| 2014/0044318 A1 | 2/2014 | Derakhshani et al. |
| 2014/0337930 A1 | 11/2014 | Hoyos et al. |
| 2016/0080653 A1 | 3/2016 | Kim et al. |
| 2016/0286108 A1 | 9/2016 | Fettig et al. |
| 2017/0094149 A1 | 3/2017 | Galor Gluskin et al. |
| 2017/0094210 A1 | 3/2017 | Galor Gluskin |
| 2019/0068872 A1 | 2/2019 | Wang et al. |
| 2020/0026906 A1 | 1/2020 | Ajiki et al. |
| 2020/0342245 A1 | 10/2020 | Lubin et al. |

FOREIGN PATENT DOCUMENTS

| | | | |
|---|---|---|---|
| KR | 10-2018-0056754 A | 5/2018 | |
| WO | 2017/052918 A1 | 3/2017 | |
| WO | 2018/175603 A1 | 9/2018 | |
| WO | WO 2018164411 A * | 9/2018 | ............. G06F 3/107 |

OTHER PUBLICATIONS

European Search Report dated Feb. 8, 2023, issued in European Application No. 21750472.9.

Sooyeon Kim et al., "Face Liveness Detection Using a Light Field Camera", Department of Electrical and Electronic Engineering, Yonsei University, 134 Shinchon-Dong, Seodaemun-Gu, Seoul 120-749, Korea, Published online Nov. 27, 2014.

* cited by examiner

ELECTRONIC DEVICE AND METHOD FOR RECOGNIZING OBJECT

CROSS-REFERENCE TO RELATED APPLICATION(S)

This application is based on and claims priority under 35 U.S.C. § 119(a) of a Korean patent application number 10-2020-0015176, filed on Feb. 7, 2020, in the Korean Intellectual Property Office, the disclosure of which is incorporated by reference herein its entirety.

BACKGROUND

1. Field

The disclosure relates to an electronic device for capturing an image and recognizing an object and a method for recognizing an object.

2. Description of Related Art

An electronic device, such as a smartphone or a tablet personal computer (PC), may perform various functions. For example, the electronic device may perform functions such as call, web search, video playback, and music playback. Furthermore, the electronic device may provide a security function through user authentication. Furthermore, the electronic device may perform user authentication through face recognition and unlock a screen or may log in to a banking application depending on the result of performing the user authentication.

The above information is presented as background information only to assist with an understanding of the disclosure. No determination has been made, and no assertion is made, as to whether any of the above might be applicable as prior art with regard to the disclosure.

SUMMARY

An electronic device according to an existing technology may release a lock or may execute a security function, based on face recognition. To defend a spoofing attack of defrauding a face recognition system using a fake face, the electronic device may use a liveness detection technology which uses an RGB image.

1) A liveness model of learning a characteristic of an RGB image using a deep learning technique or 2) an edge detector model of detecting an edge of a printed object or a two-dimensional (2D) digital photo is used as the liveness detection technology. The liveness model has degraded fake discrimination performance in a dark environment, such as a darkroom, as an RGB image is used. The edge detector model is effective when a boundary (or a boundary edge) of a spoofing object is included in an image, but has degraded performance when the boundary is close enough not to be included in the image. To enhance liveness detection performance, a time of flight (ToF) sensor may be added, but costs are incurred due to the addition of the sensor and a display hole for mounting an infra-red (IR) light emitting diode (LED) and an IR receiver is added.

Aspects of the disclosure are to address at least the above-mentioned problems and/or disadvantages and to provide at least the advantages described below. Accordingly, an aspect of the disclosure is to provide an electronic device for recognizing an object using a 2PD image sensor.

Additional aspects will be set forth in part in the description which follows and, in part, will be apparent from the description, or may be learned by practice of the presented embodiments.

In accordance with an aspect of the disclosure, an electronic device is provided. The electronic device includes a camera configured to include an image sensor including a plurality of pixels, a memory, and a processor configured to control the camera. Each pixel included in the plurality of pixels may include a plurality of photodiodes and a microlens covering the plurality of photodiodes. The processor may be configured to obtain phase images and image data for an external object using the plurality of photodiodes of the image sensor and authenticate the external object using the phase images and the image data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
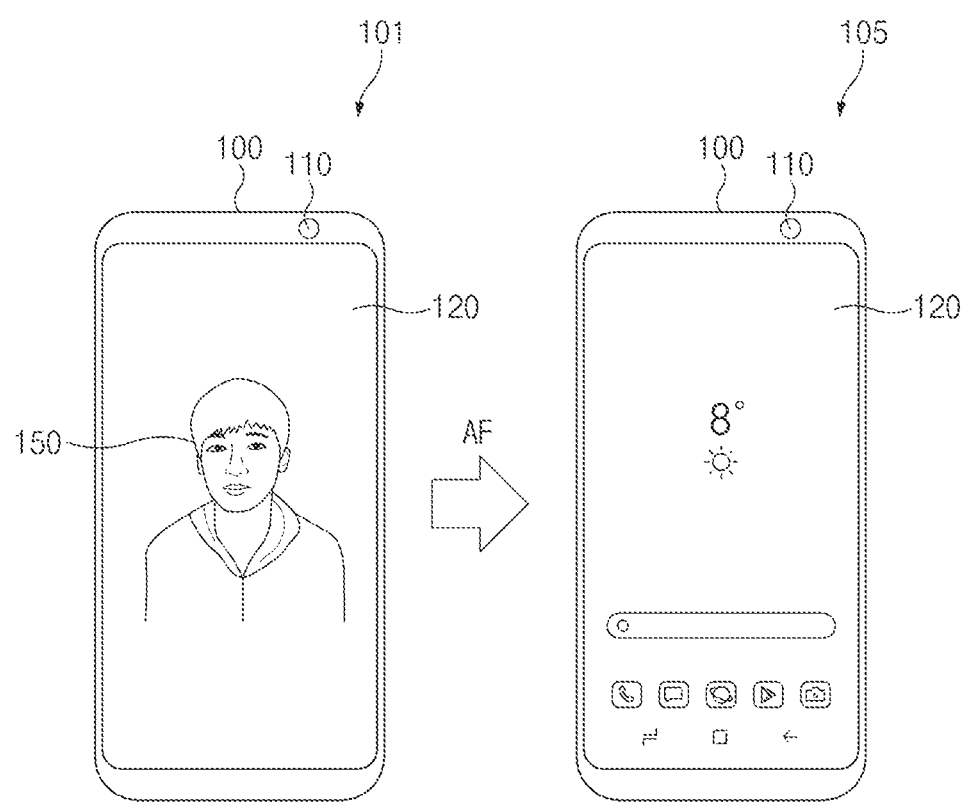
FIG. 1 is a drawing illustrating an electronic device according to an embodiment of the disclosure.

FIG. 1 is a drawing illustrating an electronic device according to an embodiment of the disclosure.

Referring to FIG. 1, an electronic device 100 may recognize an object (e.g., a face) 150 based on image data obtained using a camera module (for example, a camera device, or a camera) 110. The electronic device 100 may authenticate the recognized object (e.g., the face) 150 and may provide a security function (e.g., execute an application which needs user authentication). For example, the electronic device 100 may unlock a screen or may log in to a banking application, through authentication of the object (e.g., a face) 150. Hereinafter, a description will be given of, but not limited to, a case where the object 150 is a face of a person.

The camera module 110 may include, for example, a lens assembly including one or more lens and an image sensor. Each pixel of the image sensor may include a plurality of photodiodes (PDs).

On screen 101, the electronic device 100 may generate phase images by optical path differences generated by a plurality of PDs which share a microlens. The plurality of PDs may be arranged at an adjacent location on a continuous or periodic basis. The plurality of PDs may be electrically separated from each other and may optically have the same characteristic.

The electronic device 100 may recognize the object (e.g., a face) 150 based on the generated phase images. The electronic device 100 may determine a binning mode (or a binning level) for the phase images and may determine a depth in RGB data or the phase images. The electronic device 100 may determine liveness for the object (e.g., a face) 150 using the RGB data (or an RGB image) or the phase images to perform user authentication.

On screen 105, when the user authentication is completed, the electronic device 100 may execute a specified application or service associated with the user authentication (e.g., display another screen (activity) different from a user authentication screen on a display 120). For example, when the user authentication is completed, the electronic device 100 may unlock a lock state of the display 120 or may log in to the banking application.

It is illustratively shown that the camera module 110 is the front camera of the electronic device 100 in FIG. 1, but not limited thereto. For example, the camera module 110 may be positioned at least one of a rear surface or a side surface of the electronic device 100.

Figure 2:
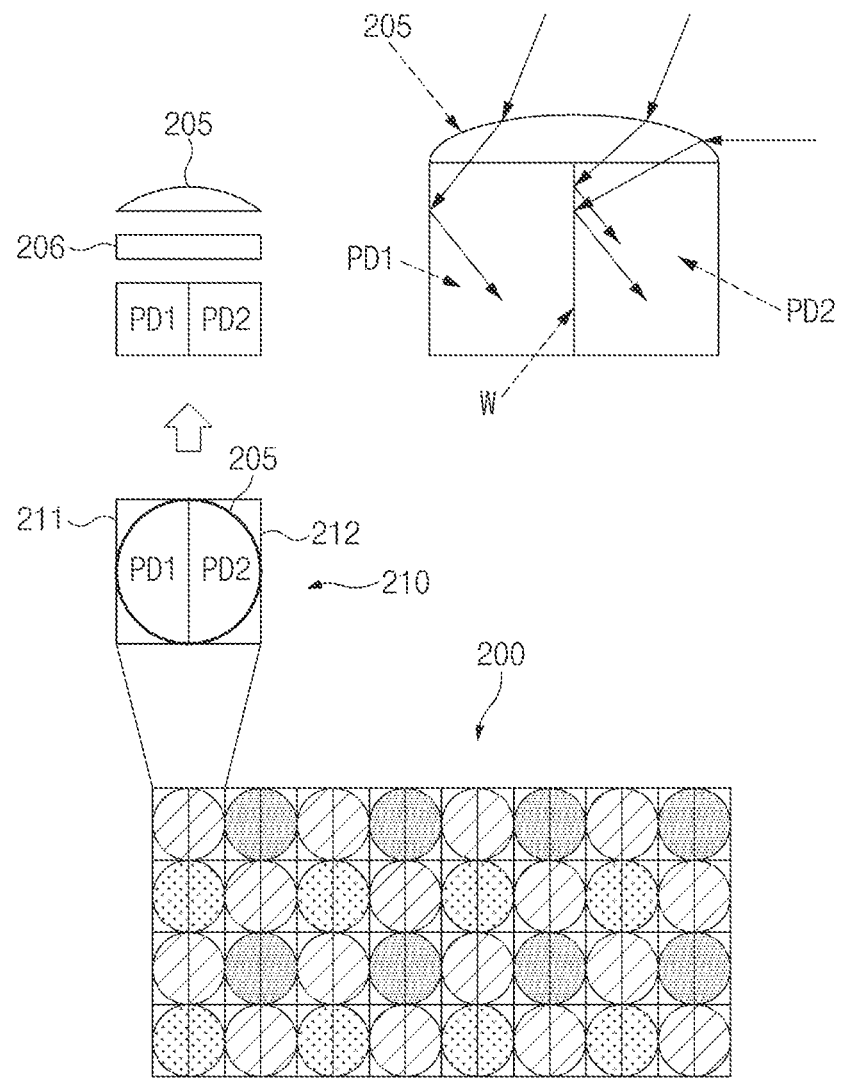
FIG. 2 is a drawing illustrating a configuration of an image sensor included in a camera module according to an embodiment of the disclosure.

FIG. 2 is a drawing illustrating a configuration of an image sensor included in a camera module according to an embodiment of the disclosure.

Referring to FIG. 2, an image sensor 200 included in a camera module (e.g., a camera module 110 of FIG. 1) may include a plurality of pixels. It is illustratively shown that the image sensor 200 outputs a Bayer-patterned image based on a signal generated by a 2PD image sensor in FIG. 2, but not limited thereto.

Hereinafter, a description will be given of, but not limited to, a case where the image sensor 200 generates left/right phase images (or 2PD raw data) and Bayer-patterned RGB data.

According to an embodiment, one 210 of a plurality of pixels may include a microlens 205, a color filter 206, a first PD (or a first sub-pixel) (PD1) 211, and a second PD (or a second sub-pixel) (PD2) 212.

The microlens 205 may cover the first PD 211 and the second PD 212. The microlens 205 may adjust a path of an incident light such that light incident from the outside may arrive at the first PD 211 and the second PD 212.

The color filter 206 may be positioned between the microlens 205 and PDs (the first PD 211 and the second PD 212) to pass light of a specified wavelength range (e.g., a wavelength range corresponding to green light). The color filter 206 may allow only the light of the specified wavelength range in light passing through the microlens 205 to arrive at the first PD 211 and the second PD 212 and may limit light except from the specified wavelength range.

Each of the first PD 211 and the second PD 212 may convert light passing through the microlens 205 and the color filter 206 into an electrical signal. As light introduced from the outside (e.g., light reflected from an object) may be reflected by the microlens 205, a path thereof may be changed. Light passing through the microlens 205 may be directly introduced into PDs, or may be reflected from a pixel wall W between the PDs to be introduced into the PDs.

For example, when light reflected from the same point (or an adjacent point) of a face object (e.g., an object 150 of FIG. 1) is incident to the first PD 211 and the second PD 212, an optical path difference may be generated by refraction through the microlens 205 or reflection by the pixel wall W. Thus, a phase difference may occur between first data of the first PD 211 and second data of the second PD 212. An electronic device (e.g., an electronic device 100 of FIG. 1) may generate a 2PD disparity map by the phase difference and may use the 2PD disparity map in a process of recognizing the object 150.

Figure 3:
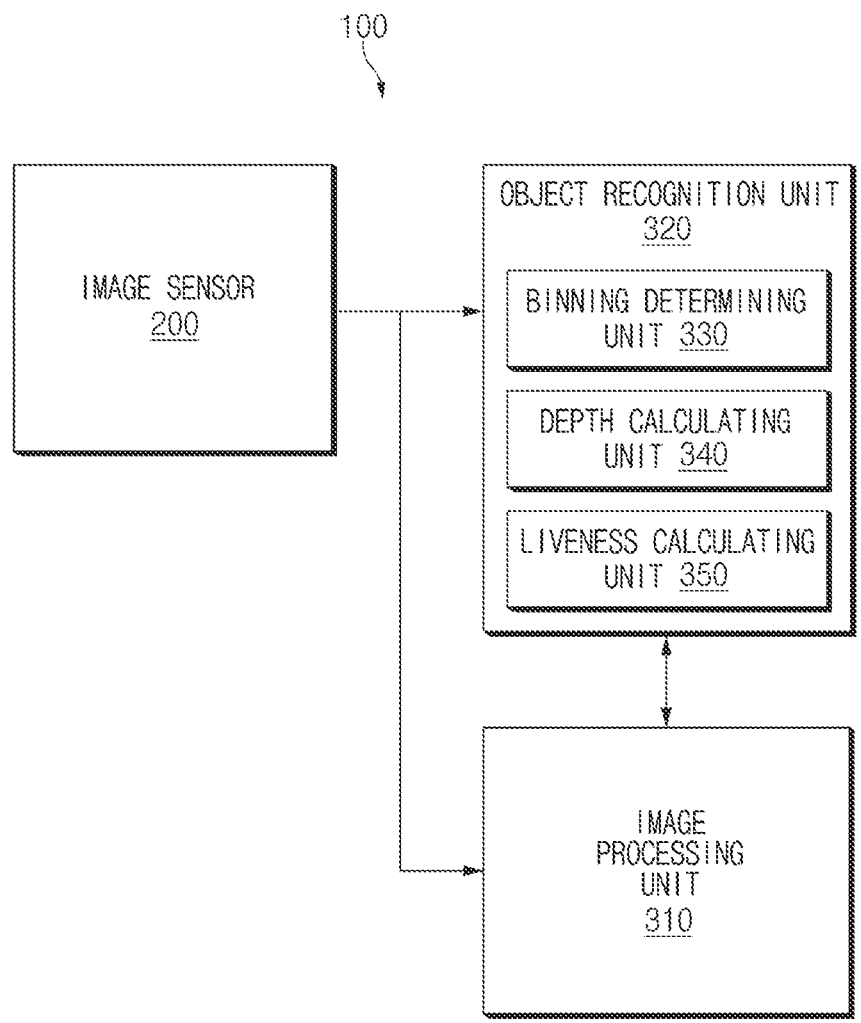
FIG. 3 is a block diagram illustrating a configuration of an electronic device according to an embodiment of the disclosure.

FIG. 3 is a block diagram illustrating a configuration of an electronic device according to an embodiment of the disclosure. FIG. 3 is separated according to a function, but not limited thereto. For example, an image sensor 200 and an image processing unit 310 may be integrated into one, or the image processing unit 310 and an object recognition unit 320 may be integrated into one. Furthermore, an operation of the image processing unit 310 and the object recognition unit 320 may be an operation by calculation of a processor in an electronic device 100.

Referring to FIG. 3, the electronic device 100 may include the image sensor 200, the image processing unit 310, and the object recognition unit 320.

The image sensor 200 may include a plurality of pixels. The image sensor 200 may generate left/right phase images and Bayer-patterned RGB data based on a signal generated by a 2PD image sensor.

The image processing unit 310 may process RGB data collected by the image sensor 200. The image processing unit 310 may deliver information necessary for object recognition to the object recognition unit 320.

The object recognition unit 320 may recognize and authenticate a face object (e.g., an object 150 of FIG. 1). The object recognition unit 320 may recognize and authenticate the object 150 using all the left/right phase images and the RGB data. According to an embodiment, the object recognition unit 320 may include a binning determining unit 330, a depth calculating unit 340, and a liveness calculating unit 350.

The binning determining unit 330 may determine a binning mode (or a binning level or a binning model) for the left/right phase images. The binning determining unit 330 may determine a binning mode of the left/right phase images based on depth information of the object 150 or illumination information around the object 150.

The depth calculating unit 340 may calculate depth information with the object 150 based on the left/right phase images or the RGB data. The depth information may be used to determine a binning level of the object 150 or determine liveness.

The liveness calculating unit 350 may determine liveness of the object 150 (whether the object 150 is alive) based on the left/right phase images or the RGB data. The liveness calculating unit 350 may use liveness models of various algorithms. The liveness calculating unit 350 may determine liveness using depth information, a 2PD disparity map, and edge information.

Figure 4:
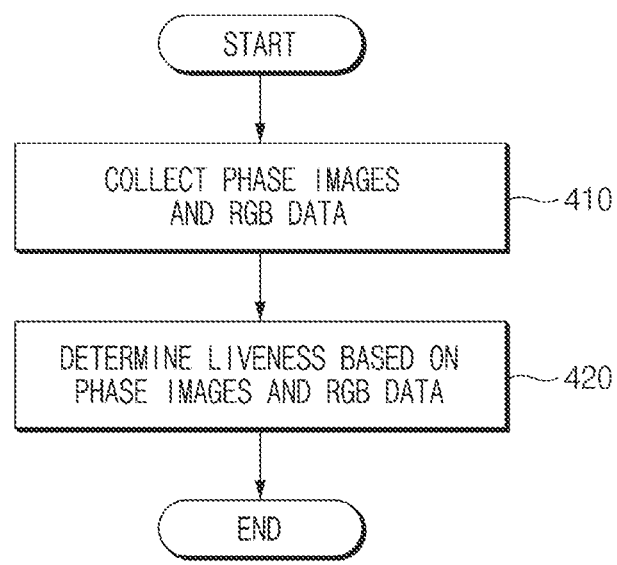
FIG. 4 is a flowchart illustrating a method for recognizing an object according to an embodiment of the disclosure.

FIG. 4 is a flowchart illustrating a method for recognizing an object according to an embodiment of the disclosure.

Referring to FIG. 4, at operation 410, an image sensor (e.g., an image sensor 200 of FIG. 3) may collect left/right phase images and RGB data for a face object (e.g., an object 150 of FIG. 1). For example, an electronic device (e.g., an electronic device 100 of FIG. 3) may capture the object 150 using a camera module (e.g., a camera module 110 of FIG. 1) in a screen lock state. The image sensor 200 in the camera module 110 may output the left/right phase images and the RGB data.

At operation 420, a processor of the electronic device 100 may determine liveness of the object 150 using the left/right phase images and the RGB data. For example, the processor may generate a 2PD disparity map using the left/right phase images. The processor may detect an edge using the RGB data or may calculate liveness of the RGB data. The processor may reflect information about a distance from the object 150, information about illumination around the object 150, or the like in an overall manner to determine liveness of the object 150. The processor may determine whether the object 150 is a real face of the user or a fake face using a photo or an image, depending on the calculated liveness level.

Figure 5:
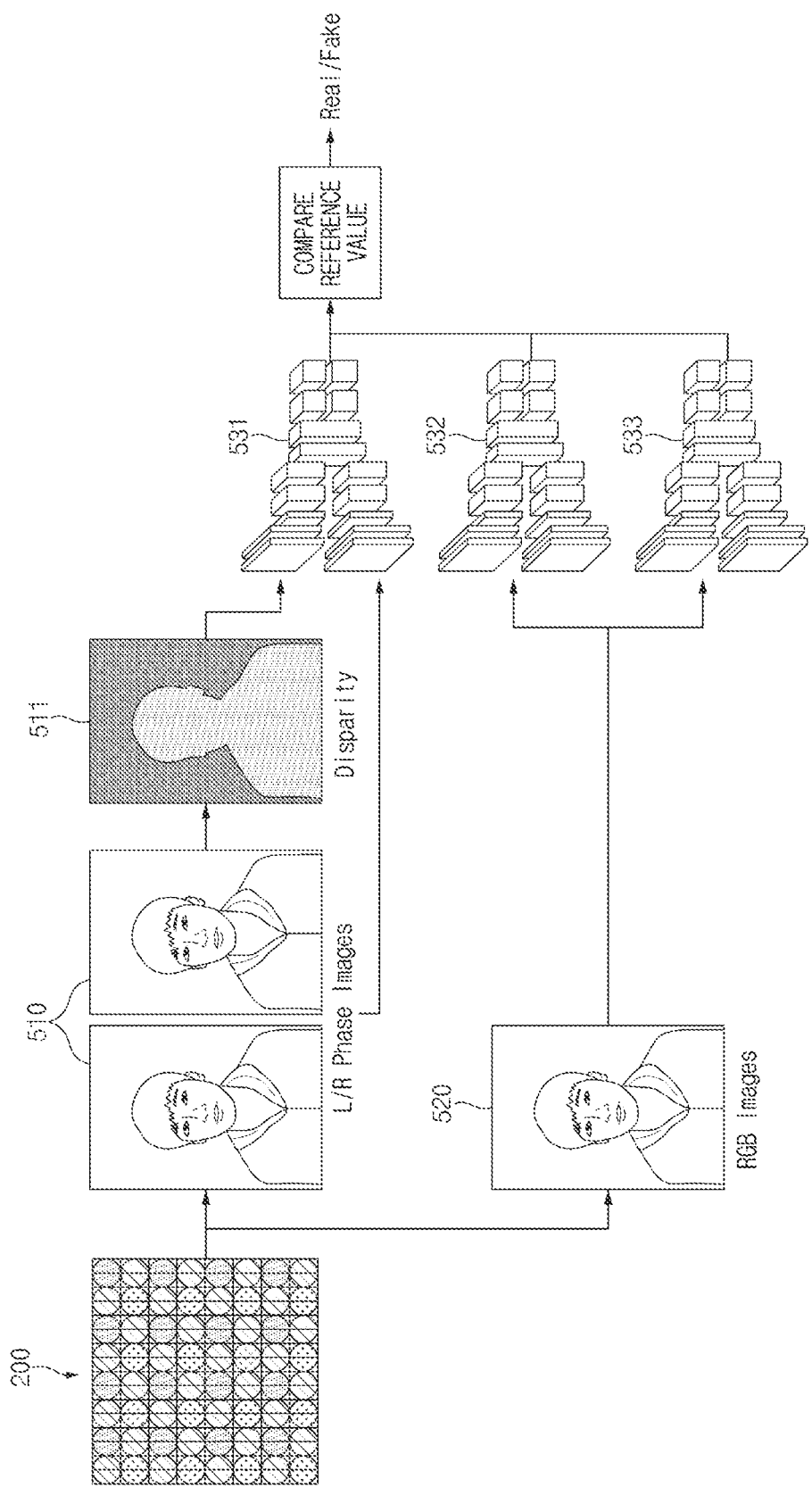
FIG. 5 is a drawing illustrating a method for recognizing an object according to an embodiment of the disclosure.

FIG. 5 is a drawing illustrating a method for recognizing an object according to an embodiment of the disclosure. FIG. 5 is illustrative, but not limited thereto.

Referring to FIG. 5, an image sensor (e.g., an image sensor 200 of FIG. 3) may collect left/right (L/R) phase images 510 and RGB data 520 for a face object (e.g., an object 150 of FIG. 1). A processor of an electronic device (e.g., an electronic device 100 of FIG. 3) may determine liveness of the object 150 using all the L/R phase images 510 and the RGB data 520.

According to an embodiment, the processor may generate a 2PD disparity map 511 using the L/R phase images 510. The processor may calculate a liveness score by applying a first liveness model 531 based on the 2PD disparity map 511. The first liveness model 531 may be a model which calculates liveness with respect to a region with a large phase difference on the 2PD disparity map 511.

According to an embodiment, the processor may calculate a liveness score by applying a second liveness model 532 in the RGB data 520. The second liveness model 532 may be a model which detects an edge of the RGB data 520 (a boundary of the object 150) to calculate liveness.

According to an embodiment, the processor may calculate a liveness score by applying a third liveness model 533 for the RGB data 520 itself. The third liveness model 533 may be a model which calculates liveness depending to locations of feature points of the object 150 detected from the RGB data 520, a mutual arrangement relationship between the feature points, or a change degree over time in the feature points. Additional information about the first liveness model 531, the second liveness model 532, or the third liveness model 533 may be provided in FIG. 8.

The processor may consider information, such as information about a distance from the face object 50 or information about illumination around the object 150, in an overall manner to adjust a weight for each model. The processor may compare the calculated liveness score with a predetermined reference value to determine whether the object 150 is a real face of a user or a fake face using a photo or an image.

Figure 6:
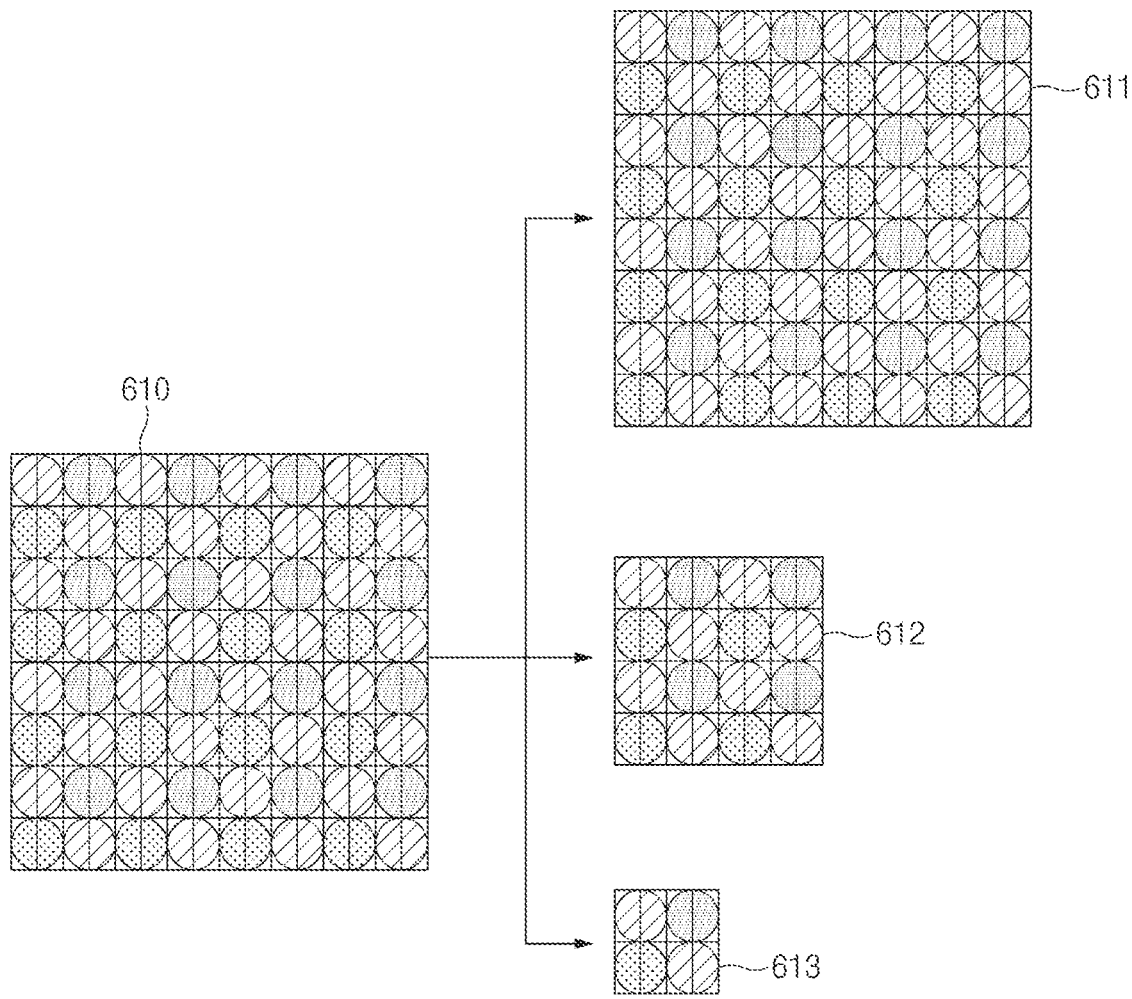
FIG. 6 is a drawing illustrating a binning mode according to an embodiment of the disclosure.

FIG. 6 is a drawing illustrating a binning mode according to an embodiment of the disclosure. FIG. 6 is illustrative, but not limited thereto.

Referring to FIG. 6, a binning determining unit (e.g., a binning determining unit 330 of FIG. 3) may determine a binning mode (or a binning level or a binning model) 611, 612, or 613 for left/right phase images 610. A data size may be reduced by selecting some of pixel data of the left/right phase images 610 depending on the binning mode. For example, for 2*8 binning, data for one pixel selected among 16 pixel regions may be maintained, and data for the other pixels may be excluded. The higher the binning level, the larger the size of a pixel region proceeding with binning and the smaller the data size.

When the binning level is reduced, memory occupancy and a data processing time of the left/right phase images 610 may be increased and precision for object recognition using the left/right phase images 610 may be enhanced. On the other hand, when the binning level is increased, the memory occupancy and the data processing time may be reduced and the precision for the object recognition using the left/right phase images 610 may be lowered.

For example, separate binning may fail to be performed in the first binning mode 611. In this case, the left/right phase images 610 may be maintained without selection of separate pixel data (e.g., the same resolution of 3648*2736*(L, R) as the left/right phase images 610 may be kept and the same data capacity of 19 MB as the left/right phase images 610 may be kept). Thus, memory occupancy may increase, and a data processing speed may decrease (a data processing time may increase). On the other hand, precision for object recognition using the left/right phase images may be enhanced.

For another example, binning of a middle level may be performed in the second binning mode 612 (e.g., resolution of 1824*342*(L, R) may be kept and data capacity of 1.2 MB may be kept by 2*8 binning). In this case, memory occupancy may more decrease than the first binning mode 611 and a data processing speed may more increase than the first binning mode 611. On the other hand, precision for object recognition using the left/right phase images 610 may be more lowered than the first binning mode 611.

For another example, binning of the highest level may be performed in the third binning mode 613 (e.g., resolution of 912*171*(L, R) may be kept and data capacity of 0.3 MB may be kept by 4*16 binning). In this case, memory occupancy may more decrease than the first binning mode 611 or the second binning mode 612 and a data processing speed may more increase than the first binning mode 611 or the second binning mode 612. On the other hand, precision for object recognition using the left/right phase images 610 may be more lowered than the first binning mode 611 or the second binning mode 612.

According to various embodiments, the binning determining unit 330 may determine a binning level (or a binning mode) based on parameter information received from an image processing unit (e.g., an image processing unit 310 of FIG. 3). For example, the parameter information may be, for example, camera exposure information, sensitivity information, or gain information, and the binning determining unit 330 may determine an illumination value at the time of image capture based on the parameter information. According to an embodiment, the binning determining unit 330 may determine an illumination value at the time of image capture based on information received via a separate illumination sensor.

For example, when the left/right phase images 610 are collected in a low illumination environment, the binning determining unit 330 may lower a binning level of the left/right phase images 610 to enhance precision of object recognition using the left/right phase images 610. As a result, a problem where performance of determining liveness based on RGB data is degraded in a dark environment may be supplemented.

For another example, when the left/right phase images 610 are collected in a general illumination environment or a high illumination environment, the binning determining unit 330 may enhance a binning level of the left/right phase images 610 to lower precision of object recognition using the left/right phase images 610. As a result, memory occupancy and a data processing speed may decrease.

According to various embodiments, the binning determining unit 330 may determine the binning mode 611, 612, or 613 based on distance information (or depth information) received from a depth calculating unit (e.g., a depth calculating unit 340 of FIG. 3). For example, when a distance from a face object (e.g., an object 150 of FIG. 1) is greater than or equal to (or is greater than) a predetermined first reference value, the binning determining unit 330 may lower a binning level depending to the first binning mode 611 or may fail to proceed with binning. As a result, precision of object recognition using the left/right phase images 610 may be enhanced. When the distance is distant from the object 150, because a 2PD disparity characteristic calculated in the left/right phase images 610 is degraded, the binning determining unit 330 may lower a binning level to enhance precision of object recognition.

For another example, when the distance from the object 150 is less than (or is less than or equal to) the predetermined first reference value and is greater than or equal to (is greater than) a predetermined second reference value, the binning determining unit 330 may proceed with binning of a middle level depending on the second binning mode 612. As a result, precision of object recognition using the left/right phase images 610 may be reflected as a suitable level.

For another example, when the distance from the object 150 is less than or equal to (or is less than) the predetermined second reference value, the binning determining unit 330 may proceed with binning of the highest level depending on the third binning mode 613. As a result, precision of object recognition using the left/right phase images may be lowered. When the distance is close to the object 150, because the 2PD disparity characteristic calculated in the left/right phase images 610 is improved, it may be easy to perform object recognition although a binning level is enhanced.

According to various embodiments, the binning determining unit 330 may provide the depth calculating unit 340 with the binned left/right phase images 610 to be used. Furthermore, the binning determining unit 330 may provide a liveness calculating unit (e.g., a liveness calculating unit 350 of FIG. 3) with the binned left/right phase images to be used to determine liveness.

Figure 7:
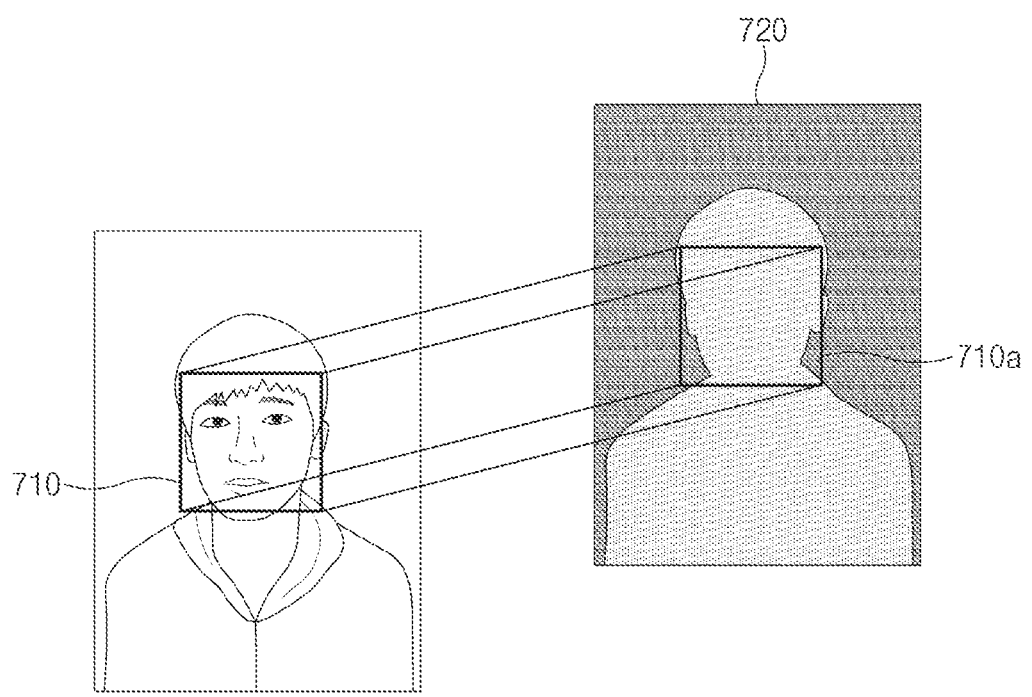
FIG. 7 is a drawing illustrating calculating a depth by detecting a face region according to an embodiment of the disclosure.

FIG. 7 is a drawing illustrating calculating a depth by detecting a face region according to an embodiment of the disclosure. FIG. 7 is illustrative, but not limited thereto.

Referring to FIG. 7, a depth calculating unit (e.g., a depth calculating unit 340 of FIG. 3) may calculate depth information with a face object (e.g., an object 150 of FIG. 1) based on left/right phase images or RGB data. The calculated depth information may be used to determine a binning level of the object 150 or determine liveness.

According to various embodiments, the depth calculating unit 340 may calculate depth information based on a face region (or a face size) 710 of the object 150 detected from the RGB data. Furthermore, the depth calculating unit 340 may calculate a depth of the object 150 by additionally using a 2PD disparity map 720 detected from the left/right phase images. For example, a real distance between a lens and a face may fail to be distant from a calculated value in an attack situation using a screen of a smartphone with a small display. In this case, when depth information is calculated using the 2PD disparity map 720, precision of the depth information may be enhanced. According to an embodiment, the depth calculating unit 340 may calculate depth information with respect to a face region 710a on the 2PD disparity map 720.

According to various embodiments, the depth calculating unit 340 may calculate depth information based on Equation 1 below.

$$D = W*d1 + (1-W)*d2 \qquad \text{Equation 1}$$

Herein, D denotes the depth information, d1 denotes the depth detected on the 2PD disparity map, d2 denotes the depth detected from the RGB image (based on the face size), and W denotes the predefined weight.

According to various embodiments, the depth calculating unit 340 may provide a liveness calculating unit (e.g., a liveness calculating unit 350 of FIG. 3) with the calculated depth information to be used to calculate a liveness score.

According to various embodiments, the depth calculating unit 340 may provide a binning determining unit (e.g., a binning determining unit 330) with the calculated depth information. The binning determining unit 330 may determine a binning mode depending on the depth information.

Figure 8:
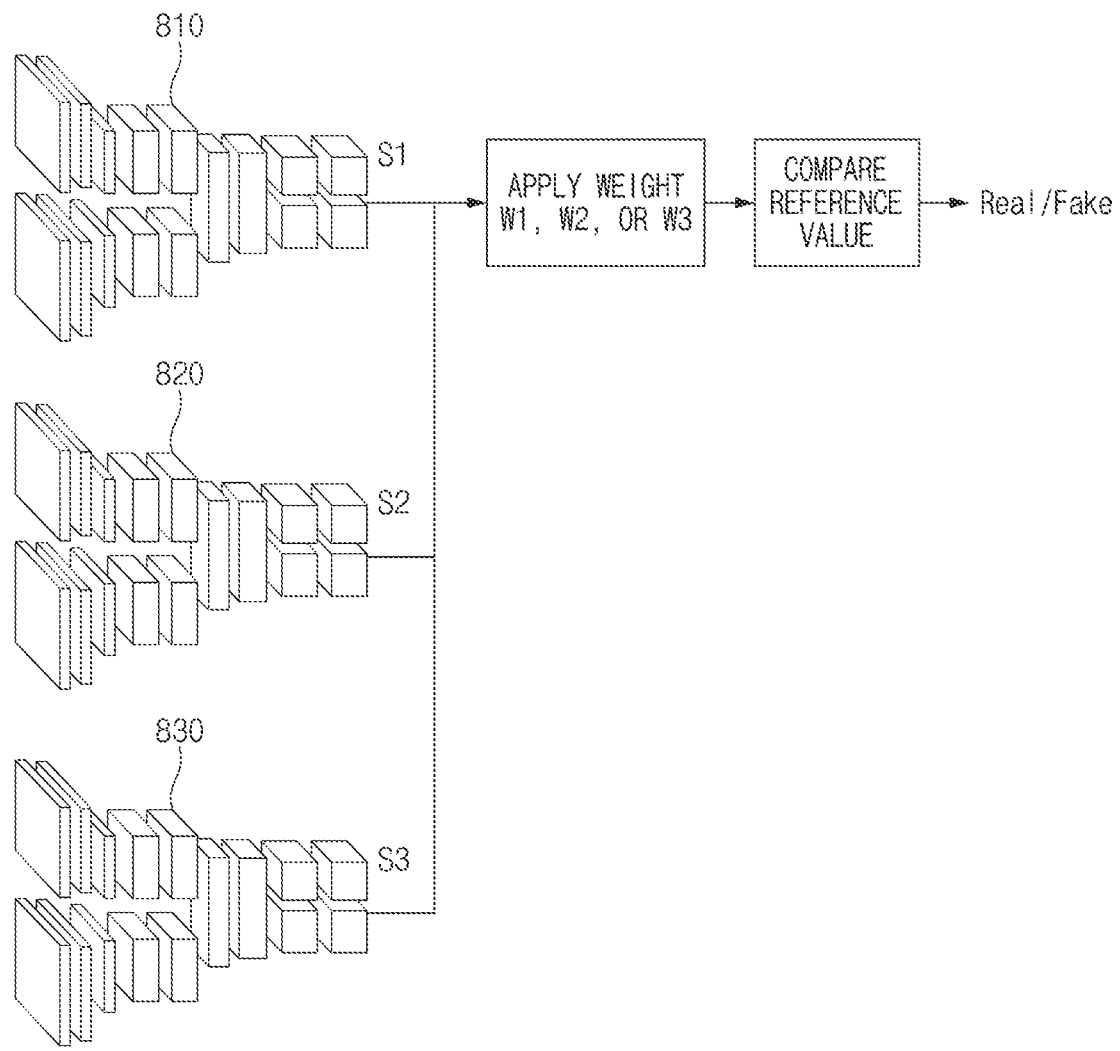
FIG. 8 is a drawing illustrating applying a liveness model according to an embodiment of the disclosure.

FIG. 8 is a drawing illustrating applying a liveness model according to an embodiment of the disclosure. FIG. 8 is illustrative, but not limited thereto.

Referring to FIG. 8, a liveness identifying unit (e.g., a liveness calculating unit 350 of FIG. 3) may determine whether a face object (e.g., an object 150 of FIG. 1) is a living object, based on left/right phase images or RGB data. The liveness calculating unit 350 may use liveness models of various algorithms.

According to various embodiments, the liveness calculating unit 350 may calculate a first liveness score S1 by applying a 2PD liveness model 810 based on a 2PD disparity map using left/right phase images. The 2PD disparity map may be generated in the liveness calculating unit 350 or may be generated via a separate component rather than the liveness calculating unit 350.

According to various embodiments, the liveness calculating unit 350 may calculate a second liveness score S2 by applying an edge liveness model (or an edge detection model) 820 by detection of an edge (a boundary of the object 150) in RGB data The edge detection may be performed in the liveness calculating unit 350 or may be performed via a separate component rather than the liveness calculating unit 350.

According to various embodiments, the liveness calculating unit 350 may calculate a third liveness score S3 by applying an RGB liveness model 830 for RGB data itself.

According to various embodiments, the liveness calculating unit 350 may consider information, such as information about a distance from the object 150 or information about illumination around the object 150, in an overall manner to determine weights W1, W2, and W3 for liveness models 810, 820, and 830, respectively, and calculate a liveness score. For example, the liveness calculating unit 350 may calculate a final liveness score using Equation 2 below.

$$S=W1*S1+W2*S2+W3*S3 \qquad \text{Equation 2}$$

Herein, S denotes the final liveness score, S1 denotes the 2PD liveness model score, S2 denotes the edge liveness model score, S3 denotes RGB liveness model score, and W1, W2 or W3 denotes the weight.

According to various embodiments, the liveness calculating unit 350 may adjust the weight W1 of the 2PD liveness model 810 or the weight W2 of the edge liveness model 820, based on depth information provided from a depth calculating unit (e.g., a depth calculating unit 340 of FIG. 3).

For example, when the depth information is greater than or equal to (or is greater than) a reference value, the liveness calculating unit 350 may lower the weight W1 of the 2PD liveness model 810 by reflecting that the more distant the distance from the object 150, the smaller the phase difference between a first PD and a second PD.

For another example, when the depth information is less than (or is less than or equal to) the reference value, the liveness calculating unit 350 may lower the weight W2 of the edge liveness model 820 by reflecting that the more close the distance from the object 150, the more the edge region is not included in RGB data. On the other hand, the liveness calculating unit 350 may enhance the weight W1 of the 2PD liveness model 810 by reflecting that the closer the distance from the object 150, the larger the phase difference between the first PD and the second PD.

The liveness calculating unit 350 may compare the calculated liveness score with a predetermined reference value to determine whether the object 150 is a real face of a user or a fake face using a photo or an image.

Figure 9:
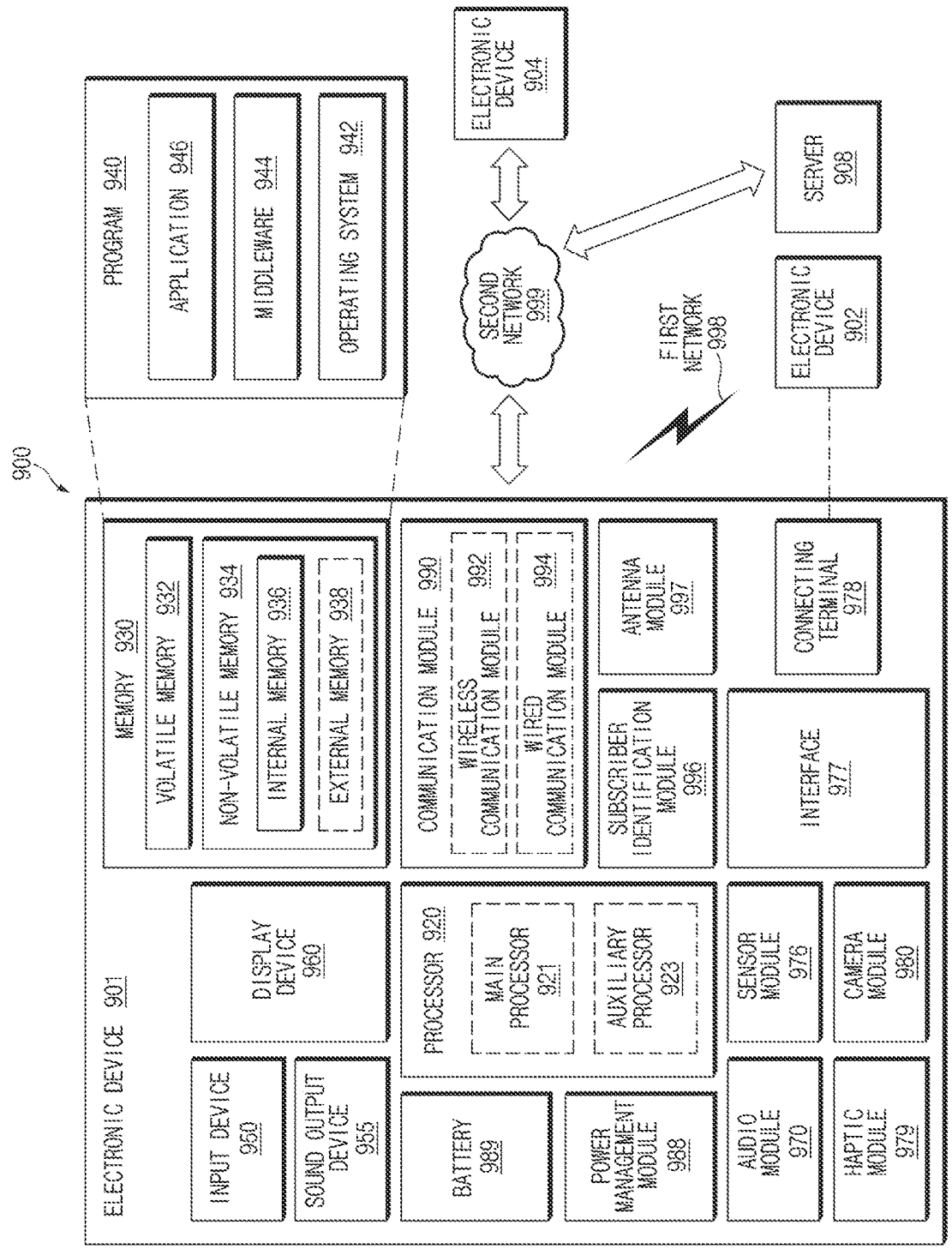
FIG. 9 is a block diagram illustrating an electronic device in a network environment according to an embodiment of the disclosure.

FIG. 9 illustrates a block diagram of an electronic device in a network environment, according to an embodiment of the disclosure. Electronic devices according to various embodiments disclosed in the disclosure may be various types of devices. An electronic device may include at least one of, for example, a portable communication device (e.g., a smartphone, a computer device (e.g., a PDA: personal digital assistant), a tablet PC, a laptop PC, a desktop PC, a workstation, or a server), a portable multimedia device (e.g., e-book reader or MP3 player), a portable medical device (e.g., heart rate, blood sugar, blood pressure, or body temperature measuring device), a camera, or a wearable device. The wearable device may include at least one of an accessory type device (e.g., watches, rings, bracelets, anklets, necklaces, glasses, contact lenses, or head wearable device head-mounted-device (HMD)), a fabric or clothing integral device (e.g., an electronic clothing), a body-attached device (e.g., skin pads or tattoos), or an bio implantable circuit. In some embodiments, the electronic device may include at least one of, for example, a television, a DVD (digital video disk) player, an audio device, an audio accessory device (e.g., a speaker, headphones, or a headset), a refrigerator, an air conditioner, a cleaner, an oven, a microwave oven, a washing machine, an air purifier, a set top box, a home automation control panel, a security control panel, a game console, an electronic dictionary, an electronic key, a camcorder, or an electronic picture frame.

In another embodiment, the electronic device may include at least one of a navigation device, GNSS (global navigation satellite system), an EDR (event data recorder (e.g., black box for vehicle/ship/airplane), an automotive infotainment device (e.g., vehicle head-up display), an industrial or home robot, a drone, ATM (automated teller machine), a POS (point of sales) instrument, a measurement instrument (e.g., water, electricity, or gas measurement equipment), or an Internet of Things device (e.g. bulb, sprinkler device, fire alarm, temperature regulator, or street light). The electronic device according to the embodiment of the disclosure is not limited to the above-described devices. Further, for example, as in a smart phone equipped with measurement of biometric information (e.g., a heart rate or blood glucose) of an individual, the electronic device may have a combination of functions of a plurality of devices. In the disclosure, the term "user" may refer to a person using the electronic device or a device (e.g., an artificial intelligence electronic device) using the electronic device.

Referring to FIG. 9, the electronic device 901 (e.g., the electronic device 100 of FIG. 1) in the network environment 900 may communicate with an electronic device 902 over a first network 998 (e.g., a short range wireless communication network) or may communicate with an electronic device 904 or a server 908 over a second network 999 (e.g., a long distance wireless communication network), according to an embodiment of the disclosure. According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module 996, or an antenna module 997. In any embodiment, at least one (e.g., the display device 960 or the camera module 980) of the components may be omitted from the electronic device 901, or one or more other components may be further included in the electronic device 901. In any embodiment, some of the components may be implemented with a single integrated circuit. For example, the sensor module 976 (e.g., a fingerprint sensor, an iris sensor, or an illumination sensor) may be embedded in the display device 960 (e.g., a display).

The processor 920 may execute, for example, software (e.g., a program 940) to control at least one other component (e.g., a hardware or software component) of the electronic device 901 connected to the processor 920, and may perform various data processing or operations. According to an embodiment, as at least a part of the data processing or operations, the processor 920 may load a command or data received from any other component (e.g., the sensor module 976 or the communication module 990) to a volatile memory 932, may process the command or data stored in the volatile memory 932, and may store processed data in a nonvolatile memory 934. According to an embodiment, the processor 920 may include a main processor 921 (e.g., a central processing unit or an application processor) and an auxiliary processor 923 (e.g., a graphic processing device, an image signal processor, a sensor hub processor, or a communication processor), which may be operated independently of or together with the main processor 921. Additionally or alternatively, the auxiliary processor 923 may be configured to use lower power than the main processor 921 or to be specialized for a specified function. The auxiliary processor 923 may be implemented separately from the main processor 921 or may be implemented as a part of the main processor 921.

The auxiliary processor 923 may control at least a part of a function or states associated with at least one component (e.g., the display device 960, the sensor module 976, or the communication module 990) of the electronic device 901, for example, instead of the main processor 921 while the main processor 921 is in an inactive (e.g., sleep) state and together with the main processor 921 while the main processor 921 is in an active (e.g., an application execution) state. According to an embodiment, the auxiliary processor 923 (e.g., an image signal processor or a communication processor) may be implemented as a part of any other component (e.g., the camera module 980 or the communication module 990) which is functionally (or operatively) associated with the auxiliary processor 923.

The memory 930 may store various data which are used by at least one component (e.g., the processor 920 or the sensor module 976) of the electronic device 901. The data may include, for example, software (e.g., the program 940), or input data or output data associated with a command of the software. The memory 930 may include the volatile memory 932 or the nonvolatile memory 934.

The program 940 may be stored in the memory 930 as software, and may include, for example, an operating system 942, a middleware 944, or an application 946.

The input device 950 may receive a commands or data which will be used by a component (e.g., the processor 920) of the electronic device 901, from the outside (e.g., a user) of the electronic device 901. The input device 950 may include, for example, a microphone, a mouse, or a keyboard.

The sound output device 955 may output a sound signal to the outside of the electronic device 901. The sound output device 955 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 960 may visually provide information to the outside (e.g., the user) of the electronic device 901. The display device 960 may include, for example, a display, a hologram device, or a control circuit for controlling a projector and a corresponding device. According to an embodiment, the display device 960 may include a touch circuitry configured to sense a touch, or a sensor circuitry (e.g., a pressure sensor) configured to measure the strength of force generated by the touch.

The audio module 970 may convert sound to an electrical signal, or reversely, may convert an electrical signal to sound. According to an embodiment, the audio module 970 may obtain sound through the input device 950, or may output sound through the sound output device 955, or through an external electronic device (e.g., the electronic device 902) (e.g., a speaker or a headphone) directly or wirelessly connected with the electronic device 901.

The sensor module 976 may sense an operation state (e.g., power or a temperature) of the electronic device 901 or an external environment state (e.g., a user state), and may generate an electrical signal or a data value corresponding the sensed state. According to an embodiment, the sensor module 976 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 977 may support one or more specified protocols that may be used to directly and wirelessly connect the electronic device 901 with an external electronic device (e.g., the electronic device 902). According to an embodiment, the interface 977 may include, for example, a high definition multimedia interface (HDMI), a universal serial bus (USB) interface, a secure digital (SD) card interface, or an audio interface.

A connection terminal 978 may include a connector that may allow the electronic device 901 to be physically connected with an external electronic device (e.g., the electronic device 902). According to an embodiment, the connection terminal 978 may include, for example, a HDMI connector, a USB connector, a SD card connector, or an audio connector (e.g., a headphone connector).

The haptic module 979 may convert an electrical signal to a mechanical stimulation (e.g., vibration or movement) or an electrical stimulation which the user may perceive through the sense of touch or the sense of movement. According to an embodiment, the haptic module 979 may include, for example, a motor, a piezoelectric sensor, or an electrical stimulation device.

The camera module 980 may photograph a still image and a video. According to an embodiment, the camera module 980 may include one or more lenses, image sensors, image signal processors, or flashes (or electrical flashes).

The power management module 988 may manage the power which is supplied to the electronic device 901. According to an embodiment, the power management module 988 may be implemented, for example, as at least a part of a power management integrated circuit (PMIC).

The battery 989 may power at least one component of the electronic device 901. According to an embodiment, the battery 989 may include, for example, a primary cell not recharged, a secondary cell rechargeable, or a fuel cell.

The communication module 990 may establish a direct (or wired) communication channel or a wireless communication channel between the electronic device 901 and an external electronic device (e.g., the electronic device 902, the electronic device 904, or the server 908) or may perform communication through the established communication channel. The communication module 990 may include one or more communication processors which is operated independently of the processor 920 (e.g., an application processor) and supports direct (or wired) communication or wireless communication. According to an embodiment, the communication module 990 may include a wireless communication module 992 (e.g., a cellular communication module, a short range wireless communication module, or a global navigation satellite system (GNSS) communication module) or a wired communication module 994 (e.g., a local area network (LAN) communication module or a power line communication module). A corresponding communication module of such communication modules may communicate with an external electronic device over the first network 998 (e.g., a short range communication network such as Bluetooth, Wi-Fi direct, or infrared data association (IrDA)) or the second network 999 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 992 may verify and authenticate the electronic device 901 within a communication network, such as the first network 998 or the second network 999, by using subscriber information (e.g., international mobile subscriber identity (IMSI)) stored in the subscriber identification module 996.

The antenna module 997 may transmit a signal or a power to the outside (e.g., an external electronic device) or may receive a signal or a power from the outside. According to an embodiment, the antenna module 997 may include one or more antennas, and at least one antenna which is suitable for a communication scheme used in a computer network such as the first network 998 or the second network 999 may be selected, for example, by the communication module 990 from the one or more antennas. The signal or power may be exchanged between the communication module 990 and an external electronic device through the selected at least one antenna or may be received from the external electronic device through the selected at least one antenna and the communication module 990.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 901 and the external electronic device 904 through the server 908 connecting to the second network 999. Each of the electronic devices 902 and 904 may be a device, the kind of which is the same as or different from a kind of the electronic device 901. According to an embodiment, all or a part of operations to be executed in the electronic device 901 may be executed in one or more external devices of the external electronic devices 902, 904, or 908. For example, in the case where the electronic device 901 should perform any function or service automatically or in response to a request from the user or any other device, the electronic device 901 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 901. The electronic device 901 may process received result as it is or additionally, and may provide a result of the processing as at least a part of the response to the request. To this end, for example, a cloud computing, distributed computing, or client-server computing technology may be used.

Figure 10:
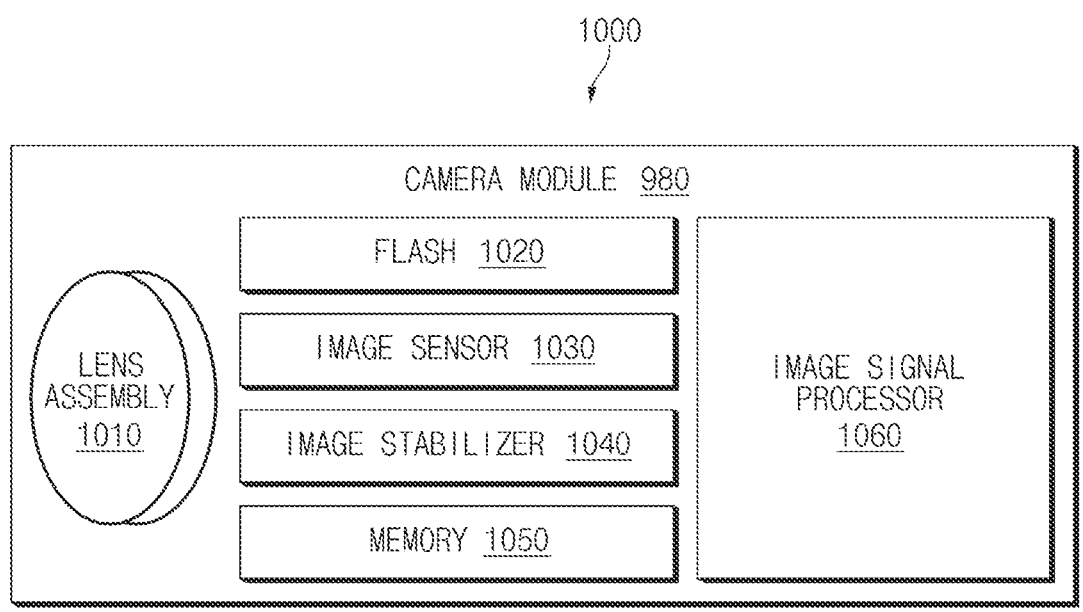
FIG. 10 is a block diagram illustrating a camera module according to an embodiment of the disclosure.

FIG. 10 is a block diagram illustrating a camera module according to an embodiment of the disclosure.

Referring to FIG. 10, the block diagram 1000 including the camera module (e.g., the camera module 110 of FIG. 1) 980 may include a lens assembly 1010, a flash 1020, an image sensor 1030, an image stabilizer 1040, memory 1050 (e.g., buffer memory), or an image signal processor 1060. The lens assembly 1010 may collect light emitted or reflected from an object whose image is to be taken. The lens assembly 1010 may include one or more lenses. According to an embodiment, the camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce light reflected from an object. According to an embodiment, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to an embodiment, the image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment, the image stabilizer 1040 may sense such a movement by the camera module 980 or the electronic device 901 using a gyro sensor (not shown) or an acceleration sensor (not shown) disposed inside or outside the camera module 980. According to an embodiment, the image stabilizer 1040 may be implemented, for example, as an optical image stabilizer. The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display device 960. Thereafter, if a specified condition is met (e.g., by a user's input or system command), at least part of the raw image stored in the memory 1050 may be obtained and processed, for example, by the image signal processor 1060. According to an embodiment, the memory 1050 may be configured as at least part of the memory 930 or as a separate memory that is operated independently from the memory 930.

The image signal processor 1060 may perform one or more image processing with respect to an image obtained via the image sensor 1030 or an image stored in the memory 1050. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display device 960, the electronic device 902, the electronic device 904, or the server 908) outside the camera module 980. According to an embodiment, the image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display device 960 as it is or after being further processed.

According to an embodiment, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

According to various embodiments, an electronic device (e.g., the electronic device 100 of FIG. 1) may include a housing including an opening, and a camera module including at least a portion exposed to an outside through the opening. The camera module may include a lens unit, and an image sensor that converts light introduced through the lens unit into an electrical signal, a magnetic member, a coil unit disposed on a first surface of the magnetic member to face the magnetic member, a magnetic substance unit attached to a second surface of the magnetic member, and a position sensor disposed to be adjacent to the magnetic member to face at least a portion of the magnetic substance part.

According to various embodiments, the position sensor may be disposed to be adjacent to a side surface of the magnetic member perpendicular to the first surface or the second surface.

According to various embodiments, the lens unit may reciprocate in a direction parallel to the first surface or the second surface by electromagnetic force generated by the magnetic member and the coil unit.

According to an embodiment, the magnetic substance unit may be in the planar shape. According to another embodiment, the magnetic substance unit may include a steeped structure. The stepped structure may be formed in an area, which corresponds to a space between the magnetic member and the position sensor, of the magnetic substance unit. The stepped structure may be formed to allow the at least a portion of the magnetic substance unit to protrude toward the position sensor.

According to various embodiments, the position sensor may sense a magnetic flux diverging through the magnetic member or the magnetic substance unit. The position sensor may include a sensing surface disposed in parallel to the first surface or the second surface.

According to various embodiments, the magnetic substance unit may include a first part attached to a first pole of the magnetic member, and a second part attached to a second pole of the second magnetic member. The first part may include a first stepped structure, and the second part may include a second stepped structure. The first stepped structure and the second stepped structure may have equal heights.

According to various embodiments, the position sensor may be a hall sensor.

According to various embodiments, an electronic device may include a housing including an opening and a camera module including at least a portion exposed to an outside through the opening. The camera module may include a lens unit, an image sensor that converts light introduced through the lens unit into an electrical signal, a first magnetic member, a second magnetic member, a first coil unit disposed on a first surface of the first magnetic member to face the first magnetic member, a second coil unit disposed on a first surface of the second magnetic member to face the second magnetic member, a magnetic substance unit attached to a second surface of the first magnetic member and a second surface of the second magnetic member, and a position sensor interposed between the first magnetic member and the second magnetic member to face at least a portion of the magnetic substance unit.

According to various embodiments, the magnetic substance unit may include a first part attached to a first pole of the first magnetic member and a first pole of the second magnetic member and a second part attached to a second pole of the first magnetic member and a second pole of the second magnetic member. The first part may include a first protruding structure, and the second part may include a second protruding structure.

According to various embodiments, the at least a portion of the magnetic substance unit may be in the first protruding structure or the second protruding structure.

According to various embodiments, the camera module may include a lens unit, an image sensor that converts light introduced through the lens unit into an electrical signal, a magnetic member, a coil unit disposed on a first surface of the magnetic member to face the magnetic member, a magnetic substance unit attached to a second surface of the magnetic member, and a position sensor disposed to be adjacent to the magnetic member to face at least a portion of the magnetic substance part.

According to various embodiments, the position sensor may be disposed to be adjacent to a side surface of the magnetic member perpendicular to the first surface or the second surface.

According to various embodiments, the magnetic substance unit may include a first part attached to a first pole of the magnetic member, and a second part attached to a second pole of the magnetic member.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 940) including an instruction stored in a machine-readable storage medium (e.g., an internal memory 936 or an external memory 938) readable by a machine (e.g., the electronic device 901). For example, the processor (e.g., the processor 920) of a machine (e.g., the electronic device 901) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

An electronic device (e.g., an electronic device 100 of FIG. 1 or an electronic device 901 of FIG. 9) according to various embodiments may include a camera module (e.g., a camera module 110 of FIG. 1 or a camera module 980 of FIG. 9) configured to include an image sensor (e.g., an image sensor 200 of FIG. 2 or an image sensor 1030 of FIG. 10) including a plurality of pixels, a memory (e.g., a memory 930 of FIG. 9), and a processor (e.g., an object recognition unit 320 of FIG. 3 or a processor 920 of FIG. 9) configured to control the camera module (e.g., the camera module 110 of FIG. 1 or the camera module 980 of FIG. 9). Each pixel included in the plurality of pixels may include a plurality of photodiodes and a microlens covering the plurality of photodiodes. The processor may obtain phase images and image data for an external object using the plurality of photodiodes of the image sensor (e.g., the image sensor 200 of FIG. 2 or the image sensor 1030 of FIG. 10) and may authenticate the external object using the phase images and the image data.

According to various embodiments, the processor (e.g., the object recognition unit 320 of FIG. 3 or the processor 920 of FIG. 9) may determine a binning mode for the phase images based on depth information about a distance from the external object or parameter information associated with image capture of the image data. The processor (e.g., the object recognition unit 320 of FIG. 3 or the processor 920 of FIG. 9) may change a size of a pixel region for selecting data of the phase images depending on the binning mode. The parameter information may include at least one of exposure information, sensitivity information or gain information of the camera module (e.g., the camera module 110 of FIG. 1 or the camera module 980 of FIG. 9).

According to various embodiments, the electronic device (e.g., the electronic device 100 of FIG. 1 or the electronic device 901 of FIG. 9) may further include an illumination sensor. The processor (e.g., the object recognition unit 320 of FIG. 3 or the processor 920 of FIG. 9) may determine a binning mode for the phase images based on illumination information at the time of image capture of the image data, the illumination information being collected by the illumination sensor.

According to various embodiments, the processor (e.g., the object recognition unit 320 of FIG. 3 or the processor 920 of FIG. 9) may calculate depth information about the external object based on the phase images and the image data and may determine liveness for the external object based on the calculated depth information.

According to various embodiments, the processor (e.g., the object recognition unit 320 of FIG. 3 or the processor 920 of FIG. 9) may calculate the depth information based on a disparity map calculated using the phase images and arrangement information of the external object, the arrangement information being calculated using the image data.

According to various embodiments, the processor (e.g., the object recognition unit 320 of FIG. 3 or the processor 920 of FIG. 9) may determine the liveness for the external object based on a first liveness score calculated based on the phase images and a second liveness score and a third liveness score calculated based on the image data.

According to various embodiments, the first liveness score may be calculated using a disparity map calculated using the phase images. The second liveness score may be calculated using edge information of the external object, the edge information being detected from the image data. The third liveness score may be calculated using information about a feature point of the external object, the feature point being detected from the image data.

According to various embodiments, the processor (e.g., the object recognition unit 320 of FIG. 3 or the processor 920 of FIG. 9) may determine a first weight for the first liveness score and a second weight for the second liveness score based on the depth information.

According to various embodiments, the processor (e.g., the object recognition unit 320 of FIG. 3 or the processor 920 of FIG. 9) may set the first weight to be lower than the second weight, when the depth information is greater than or equal to a predetermined reference value, and may set the first weight to be higher than the second weight, when the depth information is less than the predetermined reference value.

According to various embodiments, the processor (e.g., the object recognition unit 320 of FIG. 3 or the processor 920 of FIG. 9) may compare authentication information about a user, the authentication information being stored in the memory (e.g., the memory 930 of FIG. 9), with user information extracted based on the phase images or the image data to authenticate the external object, when the external object is a living object based on determining the liveness.

According to various embodiments, the plurality of pixels may include a first pixel and a second pixel. The first pixel may include a first pixel wall, a first photodiode positioned in a first direction of the first pixel wall, and a second photodiode positioned in a second direction of the first pixel wall. The second pixel may include a second pixel wall, a third photodiode positioned in the first direction of the second pixel wall, and a fourth photodiode positioned in the second direction of the second pixel wall. A first phase image among the phase images may be obtained by the first photodiode and the third photodiode, and a second phase image among the phase images may be obtained by the second photodiode and the fourth photodiode.

A method for recognizing an object in an electronic device (e.g., an electronic device 100 of FIG. 1 or an electronic device 901 of FIG. 9) according to various embodiments may include obtaining phase images and image data for an external object using an image sensor (e.g., an image sensor 200 of FIG. 2 or an image sensor 1030 of FIG. 10), including a plurality of photodiodes, of the electronic device (e.g., the electronic device 100 of FIG. 1 or the electronic device 901 of FIG. 9) and authenticating the external object using the phase images and the image data.

According to various embodiments, the authenticating may include determining a binning mode for a level selecting data of the phase images based on depth information about the external object or parameter information associated with image capture of the image data.

According to various embodiments, the authenticating may include calculating depth information about the external object based on the phase images and the image data and determining liveness for the external object based on the calculated depth information.

According to various embodiments, the authenticating may include calculating a disparity map using the phase images, calculating arrangement information of the external object using the image data, and calculating the depth information based on the disparity map and the arrangement information.

According to various embodiments, the authenticating may include determining the liveness for the external object based on a first liveness score calculated based on the phase images and a second liveness score and a third liveness score calculated based on the image data.

The electronic device according to various embodiments disclosed in the disclosure may implement a face recognition system using a 2 photodiode (2PD) image sensor of a single sensor (a single camera module).

The electronic device according to various embodiments disclosed in the disclosure may identify liveness for an external object at high precision using depth information about a distance from an object, which is calculated using the 2PD image sensor.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device, comprising:
    a camera comprising an image sensor including a plurality of pixels, wherein each pixel included in the plurality of pixels includes a plurality of photodiodes and a microlens covering the plurality of photodiodes;
    one or more processors; and
    memory
    storing one or more programs including instructions that, when executed by the one or more processors, cause the electronic device to:
        obtain a first phase image, a second phase image, and image data for an external object using the plurality of photodiodes of the image sensor,
        obtain a disparity map calculated using the first phase image and the second phase image, the disparity map identifying differences between the first phase image and the second phase image,
        determine a liveness of the external object based on the disparity map and the image data, the liveness indicating whether the external object is alive, and
        authenticate the external object using based on the determined liveness, the phase images first phase image, the second phase image, and the image data.

2. The electronic device of claim 1, wherein the one or more programs further include instructions that, when executed by the one or more processors, cause the electronic device to determine a binning mode for the first phase image and the second phase image based on depth information about a distance from the external object or parameter information associated with image capture of the image data.

3. The electronic device of claim 2, wherein the one or more programs further include instructions that, when executed by the one or more processors, cause the electronic device to change a size of a pixel region for selecting data of the first phase image and the second phase image depending on the binning mode.

4. The electronic device of claim 2, wherein the parameter information includes at least one of exposure information, sensitivity information or gain information of the camera.

5. The electronic device of claim 1, further comprising:
an illumination sensor,
wherein the one or more programs further include instructions that, when executed by the one or more processors, cause the electronic device to determine a binning mode for the first phase image and the second phase image based on illumination information at a time of image capture of the image data, the illumination information being collected by the illumination sensor.

6. The electronic device of claim 1, wherein the one or more programs further include instructions that, when executed by the one or more processors, cause the electronic device to:
calculate depth information about the external object based on the first phase image, the second phase image, and the image data, and
determine the liveness of the external object based on the calculated depth information.

7. The electronic device of claim 6, wherein the one or more programs further include instructions that, when executed by the one or more processors, cause the electronic device to calculate the depth information based on the disparity map and arrangement information of the external object, the arrangement information being calculated using the image data.

8. The electronic device of claim 6, wherein the one or more programs further include instructions that, when executed by the one or more processors, cause the electronic device to determine the liveness of the external object based on a first liveness score calculated based on the first phase image and the second phase image, and a second liveness score and a third liveness score calculated based on the image data.

9. The electronic device of claim 8, wherein the first liveness score is calculated using a.

10. The electronic device of claim 8, wherein the second liveness score is calculated using edge information of the external object, the edge information being detected from the image data.

11. The electronic device of claim 8, wherein the third liveness score is calculated using information about a feature point of the external object, the feature point being detected from the image data.

12. The electronic device of claim 8, wherein the one or more programs further include instructions that, when executed by the one or more processors, cause the electronic device to determine a first weight for the first liveness score and a second weight for the second liveness score based on the depth information.

13. The electronic device of claim 12, wherein the one or more programs further include instructions that, when executed by the one or more processors, cause the electronic device to:
set the first weight to be lower than the second weight, when the depth information is greater than or equal to a predetermined reference value, and
set the first weight to be higher than the second weight, when the depth information is less than the predetermined reference value.

14. The electronic device of claim 8, wherein the one or more programs further include instructions that, when executed by the one or more processors, cause the electronic device to compare authentication information about a user, the authentication information being stored in the memory, with user information extracted based on the first phase image and the second phase image, or the image data to authenticate the external object, when the external object is a living object based on determining the liveness.

15. The electronic device of claim 1,
wherein the plurality of pixels comprise a first pixel and a second pixel,
wherein the first pixel comprises a first pixel wall, a first photodiode positioned in a first direction of the first pixel wall, and a second photodiode positioned in a second direction of the first pixel wall,
wherein the second pixel comprises a second pixel wall, a third photodiode positioned in the first direction of the second pixel wall, and a fourth photodiode positioned in the second direction of the second pixel wall,
wherein the first phase image is obtained by the first photodiode and the third photodiode, and
wherein the second phase image is obtained by the second photodiode and the fourth photodiode.

16. A method for recognizing an object in an electronic device, the method comprising:
obtaining a first phase image, a second phase image, and image data for an external object using an image sensor, including a plurality of photodiodes, of the electronic device;
obtaining a disparity map calculated using the first phase image and the second phase image, the disparity map identifying differences between the first phase image and the second phase image;
determining a liveness of the external object based on the disparity map and the image data, the liveness indicating whether the external object is alive; and
authenticating the external object based on the determined liveness, the first phase image and the second phase image, and the image data.

17. The method of claim 16, wherein the authenticating comprises:
determining a binning mode for a level selecting data of the first phase image and the second phase image based on depth information about the external object or parameter information associated with image capture of the image data.

18. The method of claim 16, wherein the determining of the liveness comprises:
calculating depth information about the external object based on the first phase image, the second phase image, and the image data; and
determining the liveness of the external object based on the calculated depth information.

19. The method of claim 18, wherein the determining of the liveness further comprises:
calculating arrangement information of the external object using the image data; and
calculating the depth information based on the disparity map and the arrangement information.

20. The method of claim 18, wherein the determining of the liveness further comprises:
determining the liveness of the external object based on a first liveness score calculated based on the first phase image and the second phase image, and a second liveness score and a third liveness score calculated based on the image data.

\* \* \* \* \*